(12) United States Patent
Adane et al.

(10) Patent No.: US 9,097,282 B2
(45) Date of Patent: Aug. 4, 2015

(54) CAGE FOR A ROLLING BEARING, NOTABLY FOR A MOTOR VEHICLE ELECTRIC POWER STEERING BEARING

(71) Applicant: Aktiebolaget SKF, Göteborg (SE)

(72) Inventors: Thierry Adane, Tours (FR); Thomas Perrotin, Saint Roch (FR); Laurent Varnoux, Saint Avertin (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/092,823

(22) Filed: Nov. 27, 2013

(65) Prior Publication Data

US 2014/0348458 A1   Nov. 27, 2014

(30) Foreign Application Priority Data

Nov. 27, 2012   (FR) ...................................... 12 61290

(51) Int. Cl.
   *F16C 33/41*   (2006.01)
   *F16C 33/38*   (2006.01)

(52) U.S. Cl.
   CPC ........... *F16C 33/3887* (2013.01); *F16C 33/416* (2013.01); *F16C 33/418* (2013.01); *F16C 2240/44* (2013.01); *F16C 2326/24* (2013.01)

(58) Field of Classification Search
   CPC ........ F16C 33/41; F16C 33/414; F16C 3/416; F16C 33/418
   USPC ........................................... 384/523, 531–534
   See application file for complete search history.

(56) References Cited

U.S. PATENT DOCUMENTS

| 2007/0116395 | A1* | 5/2007 | Toyoda | 384/533 |
| 2009/0290826 | A1* | 11/2009 | Pecher et al. | 384/527 |
| 2011/0311173 | A1* | 12/2011 | Mikami et al. | 384/491 |

FOREIGN PATENT DOCUMENTS

| DE | 102006015547 A1 | 10/2006 |
| DE | 102010047962 A1 | 4/2012 |
| FR | 2911934 A1 | 8/2008 |
| JP | 2001355637 A * | 12/2001 |
| WO | 9949228 A1 | 9/1999 |

* cited by examiner

*Primary Examiner* — Phillip A Johnson
(74) *Attorney, Agent, or Firm* — Bryan Peckjian; SKF USA Inc. Patent Dept (57) ABSTRACT

Cage for a rolling bearing comprising a plurality of pockets (13) for a plurality of rolling elements (4), at least one pocket (13) being of ellipsoidal shape and provided with means (14) of axial retention of the cage (10) on the corresponding rolling element (4), the ellipse defining the said ellipsoidal pocket (13) being determined by a major axis (A) situated in the circumferential plane of the cage (10) and a minor axis (B) in the axial direction of the cage (10).
The minor axis (B) is comprised between the major axis (A) and the diameter (D) of the rolling element (4) arranged in the said ellipsoidal pocket (13).

19 Claims, 5 Drawing Sheets

CAGE FOR A ROLLING BEARING, NOTABLY FOR A MOTOR VEHICLE ELECTRIC POWER STEERING BEARING

CROSS-REFERENCE TO RELATED APPLICATION

This application claims priority to French Patent Application No. 1261290 filed Nov. 27, 2012, the contents of which is fully incorporated herein by reference.

FIELD OF THE INVENTION

The present invention relates to the field of rolling bearings, notably rolling bearings used in motor vehicle electric power steerings.

The invention relates more particularly to the retaining cages that provide the circumferential spacing between the rolling elements of the rolling bearings.

BACKGROUND OF THE INVENTION

A motor vehicle electric power steering generally comprises an electromechanical actuator situated on the steering column or on the lower assembly which comprises mechanical components intended to perform the angular positioning of the steered wheels of the vehicle. The electromechanical actuator comprises a rotary electric motor the shaft of which is supported by at least one rolling bearing, either directly or via a ball-screw system.

The rolling bearing generally comprises an inner ring, an outer ring and a row of rolling elements, generally balls, arranged in between the rings.

A retaining cage for a rolling bearing comprising a plurality of pockets for housing balls each of which is defined in part by two claws arranged on the opposite side to a heel of the said cage is known from document FR-A1-2 911 934. Such cages are completely satisfactory in a great many applications. However, in applications involving a low rotational speed, or in applications in which the direction of rotation reverses sharply, this kind of cage runs into various difficulties. Specifically, under the effect of the balls, the cage may suffer extensive deformation and come into contact with the inner ring, causing it to become damaged or even destroyed.

In addition, when the direction in which the load is applied to the bearing is changed, for example when the wheels of a vehicle equipped with an electric power steering as described hereinabove are turned as the driver manoeuvres to the left and to the right when parking the vehicle, the cage is likewise severely deformed, or even destroyed. Moreover, it may also prove difficult to fit such a cage over the balls.

A cage comprising pockets of ellipsoidal shape, defined in such a way that each rolling element present in a corresponding pocket is in contact via the bottom of the pocket and via the two means of axial retention of the cage on the corresponding rolling element is also known, from document JP 2001-355637. A space remains between the rolling element and the side walls of the pocket in order to form a reservoir for lubricant.

However, because each rolling element is held in the corresponding pocket by three points of contact, the rolling elements cannot move circumferentially in relation to the corresponding pocket.

The rolling elements are therefore unable to move relative to one another, and this generates a significant risk of deformation if two adjacent rolling elements attempt to move in opposing directions.

The present invention seeks to overcome these disadvantages.

SUMMARY OF THE INVENTION

More particularly, the present invention seeks to provide a cage for a rolling bearing that is not very deformable, is of small size, and offers low friction between the cage and the rolling elements.

In one embodiment, the rolling bearing cage intended to provide the circumferential spacing of a row of rolling elements comprises a plurality of pockets for a plurality of rolling elements. At least one pocket is of ellipsoidal shape and provided with means of axial retention of the cage on the corresponding rolling element. The ellipse defining said ellipsoidal pocket is determined by a major axis situated in the circumferential plane of the cage and a minor axis in the axial direction of the cage.

The minor axis is comprised between the major axis and the diameter of the rolling element arranged in the said ellipsoidal pocket.

Thus, thanks to the special elliptical shape of the pocket, the rolling element present in the said pocket is in contact only via two points of contact with the walls of the pocket, notably at the bottom of the pocket and via one of the means of axial retention. Friction between the cage and the rolling elements is thus greatly reduced and the rolling element has circumferential mobility in the said ellipsoidal pocket. The risk of unforeseen deformation in the event of two adjacent balls moving in opposing directions is thus greatly reduced, notably during a movement of turning of the wheels when parking the motor vehicle.

Advantageously, the ratio between the major axis and the minor axis is comprised between 1.05 and 1.2.

The cage may comprise an annular heel from which there extend, as axial projections, separation portions which between them delimit the pockets.

In one embodiment, the means of axial retention comprise two tabs extending circumferentially towards one another from adjacent separation portions delimiting the said ellipsoidal pocket.

In another embodiment, at least one pocket has no means of axial retention of the cage on the corresponding rolling element.

The pocket that has no means of axial retention may have substantially cylindrical side walls.

Advantageously, the cage comprises two cylindrical protrusions extending axially from adjacent separation portions delimiting the pocket that has no means of axial retention in the direction away from the annular heel.

In another embodiment, at least one pocket has a spherical wall of constant thickness.

Advantageously, the said spherical pocket is provided with means of axial retention of the cage on the corresponding rolling element, the said means of axial retention comprising two claws extending circumferentially towards one another from adjacent separation portions delimiting the said spherical pocket.

A second aspect of the invention relates to a rolling bearing comprising an inner ring, an outer ring, at least one row of rolling elements arranged between the rings, and a cage as defined hereinabove.

A third aspect of the invention relates to a motor vehicle electric power steering comprising at least one rolling bearing as defined hereinabove.

BRIEF DESCRIPTION OF THE FIGURES

The present invention will be better understood from reading the detailed description of some embodiments considered by way of entirely nonlimiting example and illustrated by the attached drawings in which.

DETAILED DESCRIPTION OF THE INVENTION

Figure 1:
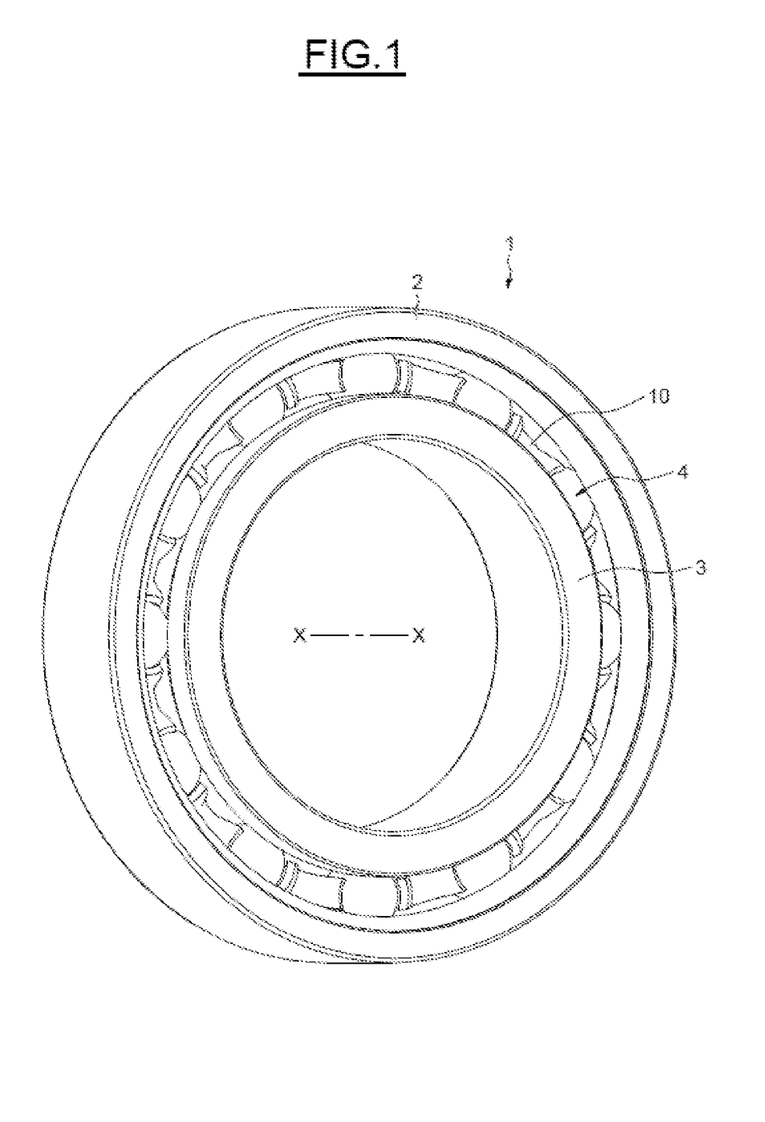
FIG. 1 is a perspective view of a rolling bearing according to a first embodiment of the invention.
Figure 2:
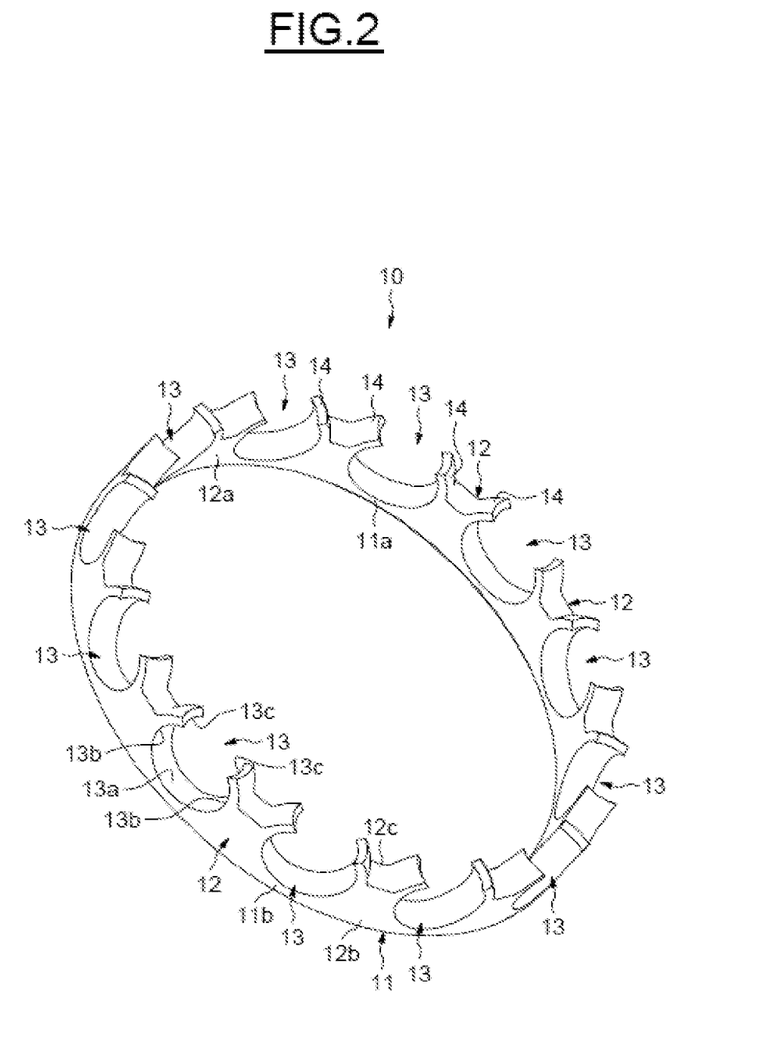
FIG. 2 is a perspective view of the cage of the bearing of FIG. 1 with a rolling element housed in a pocket.

As may be seen in FIG. 1, the rolling bearing 1, of axis X-X, comprises an outer ring 2, an inner ring 3, a plurality of rolling elements 4, here produced in the form of balls, and a cage 10 that maintains an even circumferential spacing of the rolling elements 4. The outer 2 and inner 3 rings are solid. What is meant by a "solid ring" is a ring the shape of which is obtained by machining with the removal of chips (turning, grinding) from tubes, bar stock, forged and/or rolled blanks.

The outer ring 3 comprises, in the region of its bore, a deep-grove raceway which, in cross section, has a concave internal profile tailored to the rolling elements 4, the said raceway facing radially inwards. The inner ring 3 also comprises, in the region of its cylindrical exterior surface, a deep-groove raceway which, in cross section, has a concave internal profile tailored to the rolling elements 4, the said raceway facing radially outwards. The cage 10 is arranged radially between the outer surface of the inner ring 3 and the bore of the outer ring 2.

As illustrated more visibly in FIGS. 2 to 5, the cage 10 comprises an annular axial portion 11 designed to be arranged axially on one side of the rolling elements 4 and forming an annular heel, and separation portions 12 or separation fingers extending axially from the axial portion 11. The separation portions 12 are of one piece with the axial portion 11 and between them delimit pockets 13 in which the rolling elements 4 are arranged.

The separation portions 12 take the form of pegs projecting axially from the axial portion 11. The separation portions 12 are delimited radially by an inner surface 12a aligned with the bore 11a of the axial portion 11 and by an outer surface 12b aligned with the outer surface 11b of the said axial portion 11. The separation portions 12 are delimited in the circumferential direction by substantially elliptical side walls 13b which define the pockets 13. The pockets 13 are of substantially ellipsoidal shape.

The pockets 13 comprise a wall 13a of the annular heel 11, forming the bottom of the pocket, which is substantially elliptical and connects the two side walls 13b of the pocket 13. Each pocket 13 is open radially towards the inside and towards the outside and is also open axially on the opposite side to the annular heel 11 in order to allow the cage 10 to be fitted over the rolling elements 4.

Each separation portion 11 comprises a tab 14 extending axially away from the axial portion 12 and the free end of which extends in the circumferential direction towards the opposite tab 14 of the adjacent separation portion 12 in order to delimit the same pocket 13. The elliptical inner wall 13c of each tab 14 extends in the continuation of the elliptical side walls 13b of the pocket 13. The two tabs 14 associated with one pocket 13 extend towards one another, their free ends being spaced apart by a distance that is smaller than the diameter of the rolling elements 4. The tabs 14 of a pocket 13 are capable of providing axial retention of the cage 10 by clipping over the rolling element 4 arranged in the said pocket 13. The cage 10 is thus retained axially on the row of rolling elements 4 by the tabs 14. The tabs 14 of each separation portion 12 are separated in the circumferential direction by a recess 12c to make the clipping-on easier.

The ellipse defining each pocket is determined by a major axis A in the circumferential plane of the cage 10 and a minor axis B in the axial direction of the axis X-X of the cage 10. The ellipse defining the pocket 13 is indicated in dotted line in FIG. 3.

Figure 3:
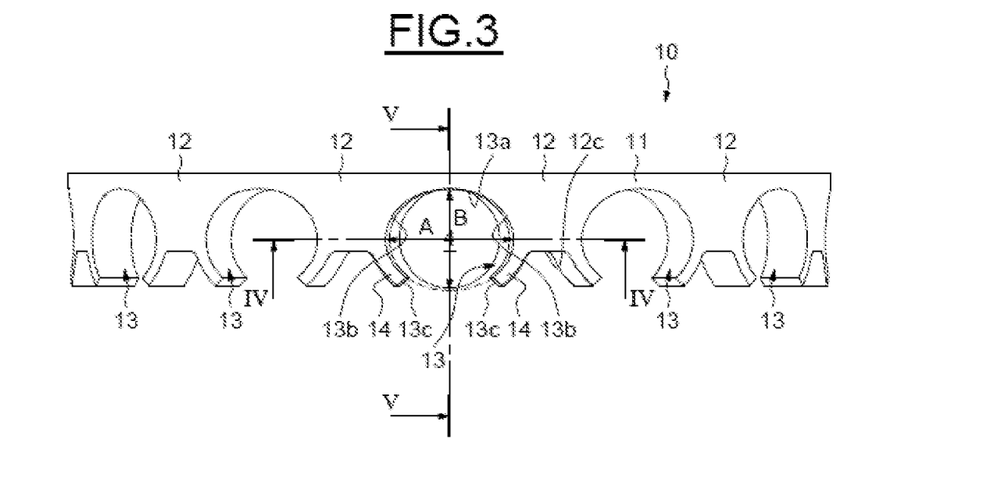
FIG. 3 is a side view of the cage of FIG. 2.
Figure 4:
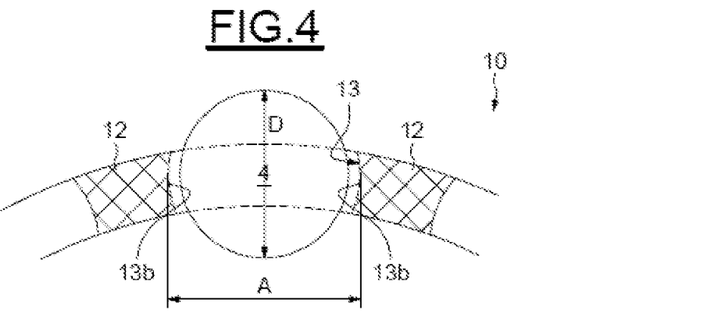
FIG. 4 is a partial view in section on IV-IV of FIG. 3.
Figure 5:
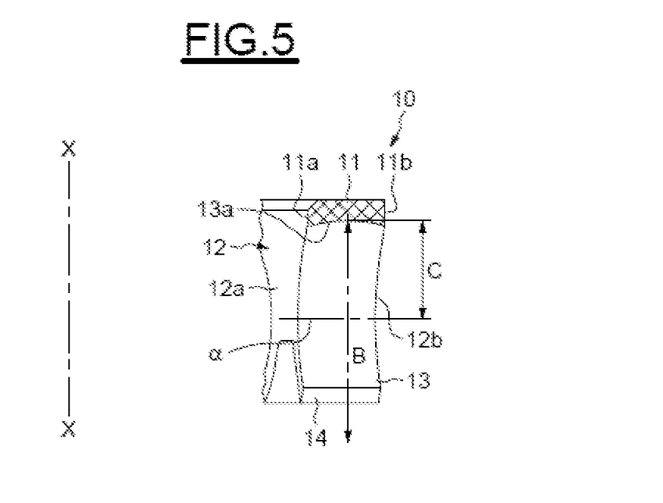
FIG. 5 is a partial view in section on V-V of FIG. 3.

In other words, the major axis A corresponds to the largest distance separating the side walls 13b of the pocket 13 in the circumferential direction. The minor axis B corresponds to twice the axial distance C between the tangent to the bottom 13a of the pocket 13 and the radial straight line a passing through the centre of the ellipse defining the pocket 13.

The minor axis B is comprised between the major axis A and the diameter D of the balls 4, according to the following equation: A>B>D. For example, the ratio between the major axis A and the minor axis B is comprised between 1.05 and 1.2.

Thus, the said rolling elements 4 are given a circumferential clearance in which to move circumferentially in relation to the ellipsoidal pockets 13.

The cage 10 is advantageously produced as a single piece by moulding a polymer material such as, for example, polyamide, notably PA, 66 or PA, 46, or alternatively a polyether ether ketone (PEEK).

Figure 6:
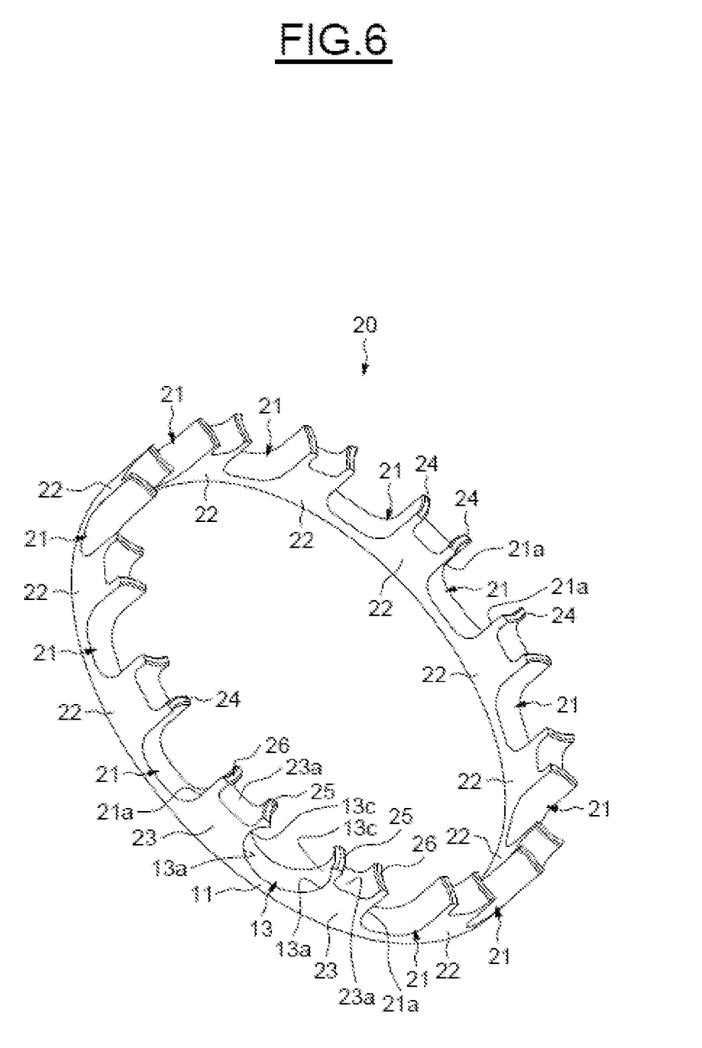
FIG. 6 is a perspective view of a cage according to a second embodiment of the invention.

In the embodiment illustrated in FIG. 6, in which identical elements bear the same references, the cage 20 comprises a single pocket 13 of substantially ellipsoidal shape for a first rolling element (not depicted), such as a ball, and which is provided with means of axial retention of the cage 20 on a rolling element housed in the said ellipsoidal pocket 13.

The cage 20 also comprises a plurality of second pockets 21 for second rolling elements of the row and which do not have means of axial retention of the cage 20 on the said second rolling elements. The second rolling elements may be identical to the first rolling elements. As an alternative, provision may be made for the second rolling elements to differ from the first rolling elements and, for example, to be rollers. The second pockets 21 which have no means of axial retention have substantially cylindrical side walls 21a.

As an alternative, it is possible to provide a cage comprising a plurality of ellipsoidal pockets 13 and at least one pocket 21 that has no means of axial retention.

The ellipsoidal pocket 13 is identical to the one described with reference to FIGS. 1 to 5. The ellipsoidal pocket 13 has substantially elliptical side walls 13b and a bottom 13a corresponding to the inner wall of the annular heel 11.

The cage 20 comprises separation portions 22 and 23 or separation fingers that extend axially from the axial portion 11 and between them delimit the pockets 13 and 21 in which the rolling elements (not depicted) are arranged.

Each separation portion 22 delimiting the second pockets 21 comprises two axial protrusions 24 of cylindrical shape extending axially away from the annular heel 11. The axial protrusion 24 of each separation portion 22 delimits, in part, with the axial protrusion 24 of the adjacent separation portion 22, one of the second pockets 21 that has no means of axial retention. Each axial protrusion 24 is unable to retain the cage 20 axially with respect to the rolling element arranged in the second pocket 21.

The separation portions 23 that delimit both the ellipsoidal pocket 13 and a cylindrical pocket 21 are referred to in the remainder of the description as hybrid separation portions. Each hybrid separation portion 23 has, on one side in the circumferential direction a side wall 21a that is substantially cylindrical so that with an adjacent separation portion 22 it forms one of the second pockets 21, next to the ellipsoidal pocket 13, and on the other side has a side wall 13b that is elliptical connecting to the elliptical side wall 13b of the adjacent hybrid separation portion 23 to form the ellipsoidal pocket 13.

Each hybrid separation portion 23 comprises a tab 25 extending axially away from the annular heel 11 and the free end of which extends in the circumferential direction towards the opposite tab 25 of the adjacent hybrid separation portion 23 to delimit the ellipsoidal pocket 13. The elliptical inner wall 13c of each tab 25 extends in the continuation of the elliptical side walls 13b of the pocket 13. The two tabs 25 associated with the pocket 13 extend towards one another, their free ends being spaced apart by a distance smaller than the diameter of the rolling elements. The tabs 25 of the ellipsoidal pocket 13 are capable of retaining the cage 20 axially by clipping onto the rolling element arranged in the said pocket 13. The cage 20 is thus axially retained on the row of rolling elements by the tabs 25.

Each hybrid separation portion 23 also comprises an axial protrusion 26 of cylindrical shape and extending axially away from the annular heel 11. The axial protrusion 26 of each hybrid separation portion 23 delimits in part, with the axial protrusion 26 of the adjacent separation portion 22, one of the second pockets 21 that has no means of axial retention.

The tab 25 and the axial protrusion 26 of each hybrid separation portion 23 are separated in the circumferential direction by a recess 23a such that the tab 25 has a relatively small circumferential thickness and a certain degree of flexibility to allow the cage 20 to be clipped over the rolling elements by a circumferential parting of the claws when axial thrust is applied to the axial portion of the cage towards the said rolling elements. Each pocket 13, 21 is open radially towards the inside and towards the outside and is also open axially on the opposite side to the annular heel 11 in order to allow the cage 20 to be fitted.

Figure 7:
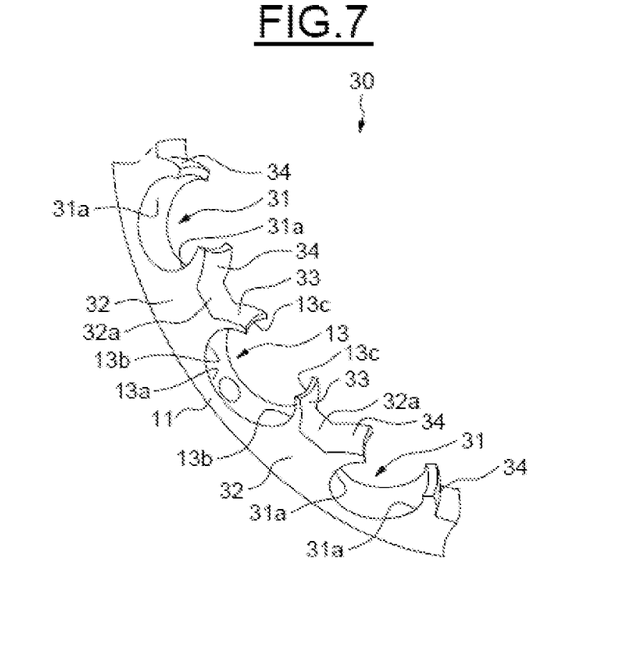
FIG. 7 is a perspective view of part of a cage according to a third embodiment of the invention.

In the embodiment illustrated in FIG. 7, in which identical elements bear the same references, the cage 30 comprises at least one pocket 13 of substantially ellipsoidal shape for a rolling element (not depicted) and is provided with means of axial retention of the cage 30 on a rolling element housed in the said ellipsoidal pocket 13. The cage 30 comprises a plurality of third pockets 31 for the rolling elements of the row and which are provided with means of axial retention of the cage 30 on the said rolling elements. The third pockets 31 have substantially spherical side walls 31a.

The ellipsoidal pocket 13 is identical to the one described with reference to FIGS. 1 to 6. The ellipsoidal pocket 13 has substantially elliptical side walls 13b and a bottom 13a corresponding to the inner wall of the annular heel 11.

The cage 30 comprises hybrid separation portions 32 or hybrid separation fingers extending axially from the axial portion 11 and between them delimiting the pockets 13 and 31 in which the rolling elements are arranged.

As illustrated in FIG. 7, the separation portions 32 delimit both the ellipsoidal pocket 13 and a spherical pocket 31. As an alternative, separation portions delimiting two spherical pockets 31 or two ellipsoidal pockets 13 could be provided. Each separation portion 32 has, on one side in the circumferential direction, a side wall 31a that is substantially spherical in order with an adjacent separation portion to form one of the spherical pockets 31, next to the ellipsoidal pocket 13, and on the other hand has a side wall 13b that is elliptical connecting to the elliptical side wall 13b of the adjacent separation portion 32 to form the ellipsoidal pocket 13.

Each separation portion 32 comprises a tab 33 extending axially away from the annular heel 11 and the free end of which extends in the circumferential direction towards the opposite tab 33 of the adjacent separation portion 32 to delimit the ellipsoidal pocket 13. The elliptical inner wall 13c of each tab 33 extends in the continuation of the elliptical side walls 13b of the pocket 13.

Each separation portion 32 also comprises a claw 34 extending axially away from the annular heel and the free end of which extends in the circumferential direction towards the opposite claw 34 of the adjacent separation portion 32 in order to delimit the spherical pocket 31. The concave inner surface of each claw 34 forms part of the spherical wall of the spherically shaped pocket 31.

The tabs 33 and the claws 34 are capable of providing axial retention of the cage 30 by clipping onto the rolling element arranged in the said pockets 13, 31. The cage 30 is thus retained axially on the row of rolling elements by the tabs 33 and the claws 34.

The tabs 33 and the claws 34 of each separation portion 32 are separated in the circumferential direction by a recess 32a.

Figure 8:
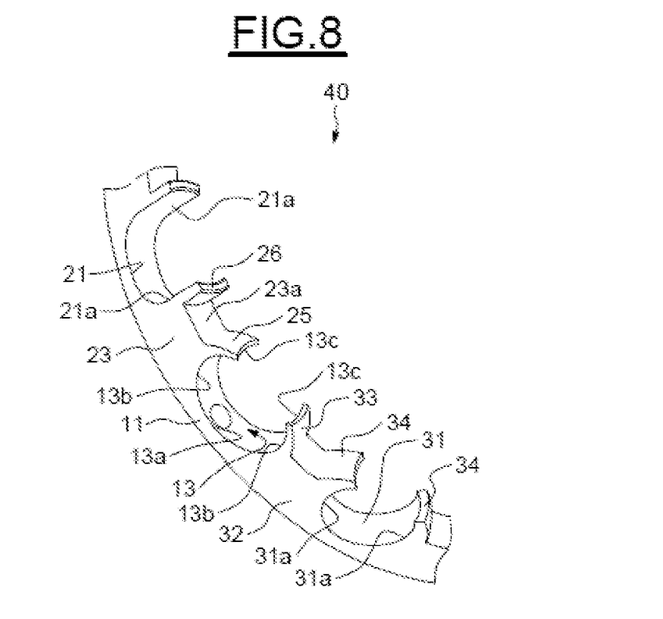
FIG. 8 is a perspective view of part of a cage according to a fourth embodiment of the invention.

In the embodiment illustrated in FIG. 8, in which identical elements bear the same references, the cage 40 comprises at least one pocket 13 of substantially ellipsoidal shape for a rolling element (not depicted) which pocket is provided with means of axial retention of the cage 40 on a rolling element housed in said ellipsoidal pocket 13. The cage 40 also comprises at least one second pocket 21 for second rolling elements of the row, having substantially cylindrical side walls 21a and no means of axial retention of the cage 40 on the said second rolling elements and at least one third pocket 31 for the first rolling elements of the row, having substantially spherical side walls 31a and provided with means of axial retention of the cage 40 on the said rolling elements.

The ellipsoidal 13, cylindrical 21 and spherical 32 pockets are identical to those described with reference to the preceding embodiments.

The ellipsoidal pocket 13 has substantially elliptical side walls 13b and a bottom 13a corresponding to the inner wall of the annular heel 11.

The cage 40 comprises hybrid separation portions or separation fingers 23 and 32 extending axially from the axial portion 11 and between them delimiting the cylindrical pockets 13, 21 and 31 in which the rolling elements are arranged.

As illustrated in FIG. 8, the separation portions 23 delimit both the ellipsoidal pocket 13 and the cylindrical pocket 21 and the separation portions 32 delimit both the ellipsoidal pocket 13 and the spherical pocket 31. As an alternative, separation portions delimiting two spherical pockets 31 or two ellipsoidal pockets 13 or two cylindrical pockets 21 could be provided. It would also be possible to provide separation portions delimiting both a spherical pocket 31 and a cylindrical pocket 21.

The separation portion 23 delimiting both the ellipsoidal pocket 13 and the cylindrical pocket 21 is identical to the separation portion described with reference to FIG. 6. The separation portion 23 has, on one side in the circumferential direction, a side wall 21a that is substantially cylindrical to form, with an adjacent separation portion 22, one of the seconds pockets 21, next to the ellipsoidal pocket 13, and has on the other side an elliptical wall 13b that connects with the elliptical wall 13b of the adjacent hybrid separation portion 23 to form the ellipsoidal pocket 13.

The separation portion 23 comprises a tab 25 the free end of which extends in the circumferential direction towards the adjacent separation portion 32 to delimit the ellipsoidal pocket 13. The elliptical inner wall 13c of each tab 25 extends in the continuation of the elliptical side walls 13b of the pocket 13. The hybrid separation portion 23 also comprises an axial protrusion 26 of cylindrical shape.

The separation portion 32 that delimits both the ellipsoidal pocket 13 and the spherical pocket 31 is identical to the separation portion described with reference to FIG. 7. The separation portion 32 has, on one side in the circumferential direction, a side wall 31a that is substantially spherical in order with an adjacent separation portion to form one of the spherical pockets 31 next to the ellipsoidal pocket 13 and has on the other side an elliptical wall 13b connecting to the elliptical wall 13b of the adjacent separation portion 32 in order to form the ellipsoidal pocket 13. The separation portion 32 comprises a tab 33 the free end of which extends in the circumferential direction towards the opposite tab 25 of the adjacent separation portion 23 to delimit the ellipsoidal pocket 13. The elliptical inner wall 13c of each tab 25, 33 extends in the continuation of the elliptical side walls 13b of the pocket 13. The separation portion 32 also comprises a claw 34 the free end of which extends in the circumferential direction towards the opposite claw 34 of the adjacent separation portion to delimit the spherical pocket 31.

By virtue of the invention, the rolling element present in the pocket of ellipsoidal shape has circumferential mobility in the said pocket, thus reducing the friction between the cage and the rolling element. The combination of ellipsoidal pockets and pockets with no means of axial retention allows the rolling elements greater mobility in the pockets. Thus, the risk of unforeseen deformation in the event of two adjacent balls moving in opposite directions is greatly reduced.

The invention claimed is:

1. A rolling bearing comprising:
    an inner ring;
    an outer ring;
    at least one row of rolling elements arranged between the ring; and
    a cage having;
    a plurality of pockets for a plurality of the rolling elements, a first portion of the plurality of pockets being of ellipsoidal shape and provided with an extended axial retention feature of the cage on a corresponding one of the rolling elements, the ellipse defining the ellipsoidal pocket being determined by a major axis situated in the circumferential plane of the cage and a minor axis in the axial direction of the cage;
    a second portion of the plurality of pockets excludes the extended axial retention feature of the cage on the corresponding rolling element; and
    a separation portion extending axially between and delineating adjacent pockets excluding the extended axial retention feature of the cage, each separation portion comprising a pair of axial protrusions exclusive of the axial retention feature, each axial protrusion of the pair of axial protrusions extends axially from a distal end of the separation portion and continuously from side walls of the associated pocket,
    wherein the minor axis is comprised between the major axis and the diameter of the rolling element arranged in the said ellipsoidal pocket.

2. The rolling bearing according to claim 1, wherein the rolling bearing is integrated into an electric power steering device for a motor vehicle.

3. The cage according to claim 1, wherein the extended axial retention feature of the cage comprises a pair of claws, each claw extending towards one another from adjacent separation portions delimiting the spherical pocket.

4. A cage for a rolling bearing comprising:
    a plurality of pockets for a plurality of rolling elements, at least one pocket being of ellipsoidal shape and provided with an extended axial retention feature of the cage on a corresponding one of the rolling elements, the ellipse defining the ellipsoidal pocket being determined by a major axis situated in the circumferential plane of the cage and a minor axis in the axial direction of the cage, the extended axial retention feature of the cage comprises two tabs extending circumferentially towards one another from adjacent separation portions delimiting the ellipsoidal pocket;
    an annular heel from which there extends, as axial projections, separation portions which between them delimit the pockets, and
    at least one pocket that excludes the extended axial retention feature of the cage on the corresponding rolling element,
    two cylindrical protrusions extending axially from adjacent separation portions delimiting the pocket that excludes the extended axial retention feature of the cage in the direction away from the annular heel,
    wherein the at least one pocket that excludes the extended axial retention feature of the cage on the corresponding rolling element further comprises substantially cylindrical side walls,
    wherein the minor axis is comprised between the major axis and the diameter of the rolling element arranged in the said ellipsoidal pocket.

5. The cage according to claim 4, wherein the ratio between the major axis and the minor axis is between 1.05 and 1.2.

6. The cage according to claim 4, wherein at least one pocket has a spherical wall of constant thickness.

7. The cage according to claim 6, wherein the at least one spherical walled pocket is provided with the extended axial retention feature of the cage on the corresponding rolling element, the extended axial retention feature of the cage comprises two claws extending circumferentially towards one another from adjacent separation portions delimiting the spherical pocket.

8. The cage according to claim 4, wherein the extended axial retention feature of the cage comprises a pair of claws, each claw extending towards one another from adjacent separation portions delimiting the spherical pocket.

9. The rolling bearing according to claim 4, wherein the rolling bearing is integrated into an electric power steering device for a motor vehicle.

10. A cage for a rolling bearing comprising:
    a plurality of pockets for a plurality of rolling elements, at least one pocket being of ellipsoidal shape and provided with an extended axial retention feature of the cage on a corresponding one of the rolling elements, the ellipse defining the ellipsoidal pocket being determined by a major axis situated in the circumferential plane of the cage and a minor axis in the axial direction of the cage;
    at least one pocket that excludes the extended axial retention feature of the cage on the corresponding rolling element;

a pair of separation portions, each separation portion being located on each respective side of the at least one pocket that excludes the extended axial retention feature of the cage;

an axial protrusion exclusive of the axial retention feature extending axially from a distal end of the separation portion and continuously from each associated side wall of the associated pocket, wherein the minor axis is comprised between the major axis and the diameter of the rolling element arranged in the said ellipsoidal pocket.

11. The cage according to claim 10, wherein the ratio between the major axis and the minor axis is between 1.05 and 1.2.

12. The cage according to claim 11, wherein the extended axial retention feature of the cage comprises a pair of claws, each claw extending towards one another from adjacent separation portions delimiting the spherical pocket.

13. The cage according to claim 10, further comprising an annular heel from which there extends, as axial projections, separation portions which between them delimit the pockets.

14. The cage according to claim 13, wherein the extended axial retention feature of the cage includes two tabs extending circumferentially towards one another from adjacent separation portions delimiting the ellipsoidal pocket.

15. The cage according to claim 14, wherein the at least one pocket that excludes the extended axial retention feature of the cage on the corresponding rolling element further comprises substantially cylindrical side walls.

16. The cage according to claim 15, further comprising two wherein the axial protrusions are formed as cylindrical protrusions extending axially in the direction away from the annular heel.

17. The cage according to claim 16, wherein at least one pocket has a spherical wall of constant thickness.

18. The cage according to claim 17, wherein the at least one spherical walled pocket is provided with the extended axial retention feature of the cage on the corresponding rolling element, the extended axial retention feature of the cage comprises two claws extending circumferentially towards one another from adjacent separation portions delimiting the spherical pocket.

19. The rolling bearing according to claim 10, wherein the rolling bearing is integrated into an electric power steering device for a motor vehicle.

\* \* \* \* \*